(12) United States Patent
Fedorov et al.

(10) Patent No.: US 11,057,495 B2
(45) Date of Patent: Jul. 6, 2021

(54) SELECTING WHERE TO PROCESS DATA ASSOCIATED WITH INTERNET OF THINGS (IOT) DEVICES

(71) Applicant: Ciena Corporation, Hanover, MD (US)

(72) Inventors: Dmitri Fedorov, Ottawa (CA); Joseph Alexander, Manotick (CA); Marco Naveda, Manotick (CA); Nelson Chao, San Jose, CA (US); Petar Djukic, Ottawa (CA)

(73) Assignee: Ciena Corporation, Hanover, MD (US)

( * ) Notice: Subject to any disclaimer, the term of this patent is extended or adjusted under 35 U.S.C. 154(b) by 17 days.

(21) Appl. No.: 16/400,538

(22) Filed: May 1, 2019

(65) Prior Publication Data

US 2020/0351380 A1 Nov. 5, 2020

(51) Int. Cl.
  *G06F 15/16* (2006.01)
  *H04L 29/08* (2006.01)
(52) U.S. Cl.
  CPC ............ *H04L 67/322* (2013.01); *H04L 67/10* (2013.01); *H04L 67/12* (2013.01)
(58) Field of Classification Search
  CPC ....... H04L 29/08; H04L 41/741; H04L 43/16; H04L 45/306; H04L 47/741; H04L 67/12; H04L 67/16; H04L 67/34; H04L 67/10; H04W 4/38; H04W 8/16; G06F 16/906; G06F 9/5044; G06F 9/5077; G11B 27/00; G06B 25/001; G06N 5/04; H04M 15/61
  See application file for complete search history.

(56) References Cited

U.S. PATENT DOCUMENTS

| | | | |
|---|---|---|---|
| 8,386,587 B2 | 2/2013 | Sagar et al. |
| 8,817,624 B2 | 8/2014 | Callard et al. |
| 8,887,217 B2 | 11/2014 | Salem et al. |
| 9,060,292 B2 | 6/2015 | Callard et al. |
| 9,392,487 B2 | 7/2016 | Au et al. |
| 9,397,917 B2 | 7/2016 | Li et al. |
| 9,432,257 B2 | 8/2016 | Li et al. |
| 9,461,729 B2 | 10/2016 | Djukic et al. |
| 9,559,980 B2 | 1/2017 | Li et al. |
| 9,560,674 B2 | 1/2017 | Djukic et al. |
| 9,642,146 B2 | 5/2017 | Zhang et al. |
| 9,819,565 B2 | 11/2017 | Djukic et al. |
| 9,838,271 B2 | 12/2017 | Djukic et al. |

(Continued)

OTHER PUBLICATIONS

Lachos, et al., Multi-domain Service Function Chaining with ALTO draft-lachos-multi-domain-sfc-alto-00, SFC WG, Internet-Draft, Intended status: Informational, Jul. 2, 2018, Expires: Jan. 3, 2019, pp. 1-14.

(Continued)

*Primary Examiner* — Dustin Nguyen
(74) *Attorney, Agent, or Firm* — Clements Bernard Walker; Lawrence A. Baratta, Jr.; Christopher L. Bernard

(57) ABSTRACT

Telecommunications systems and associated methods are provided for determining where data is to be processed. According to a procedural implementation of the present disclosure, a method includes the step of receiving data associated with an Internet of Things (IoT) device and evaluating a plurality of processing factors related to the data. Based on the step of evaluating the plurality of processing factors, the method further comprises selecting where the data will be processed.

12 Claims, 6 Drawing Sheets

(56) References Cited

U.S. PATENT DOCUMENTS

| | | | |
|---|---|---|---|
| 9,838,763 | B2 | 12/2017 | Swinkels et al. |
| 9,980,284 | B2 | 5/2018 | Djukic et al. |
| 10,015,057 | B2 | 7/2018 | Djukic et al. |
| 10,028,302 | B2 | 7/2018 | Au et al. |
| 10,034,222 | B2 | 7/2018 | Zhang et al. |
| 10,148,578 | B2 | 12/2018 | Morris et al. |
| 10,153,869 | B2 | 12/2018 | Djukic et al. |
| 2009/0241134 | A1 | 9/2009 | Garrity et al. |
| 2014/0192767 | A1 | 7/2014 | Au et al. |
| 2014/0229210 | A1 | 8/2014 | Sharifian et al. |
| 2014/0266684 | A1* | 9/2014 | Poder .................. G08B 25/001 340/521 |
| 2014/0269767 | A1 | 9/2014 | Djukic et al. |
| 2014/0310388 | A1 | 10/2014 | Djukic et al. |
| 2014/0328256 | A1 | 11/2014 | Djukic et al. |
| 2016/0301579 | A1 | 10/2016 | Djukic et al. |
| 2017/0094018 | A1* | 3/2017 | Ekstrom ................. H04W 8/16 |
| 2017/0126836 | A1* | 5/2017 | Krishna .................. H04L 67/12 |
| 2017/0155703 | A1* | 6/2017 | Hao ........................ H04L 67/12 |
| 2017/0201585 | A1* | 7/2017 | Doraiswamy ........... H04L 67/34 |
| 2017/0230267 | A1 | 8/2017 | Armolavicius et al. |
| 2017/0310565 | A1* | 10/2017 | Nedeltchev ............. H04L 41/14 |
| 2017/0332292 | A1* | 11/2017 | Ponnuswamy ......... H04L 43/16 |
| 2018/0081972 | A1* | 3/2018 | Mohanbabu ............ H04W 4/38 |
| 2018/0146041 | A1* | 5/2018 | Moustafa ................ H04L 67/16 |
| 2018/0254997 | A1* | 9/2018 | Clarke .................. H04L 45/306 |
| 2018/0300124 | A1* | 10/2018 | Malladi .................. H04L 29/08 |
| 2018/0316928 | A1* | 11/2018 | Jain ........................ G11B 27/00 |
| 2019/0044831 | A1* | 2/2019 | Guim Bernat ...... H04L 41/0806 |
| 2019/0158300 | A1* | 5/2019 | Sabella ................. H04M 15/61 |
| 2019/0325060 | A1* | 10/2019 | Fenoglio ............... G06F 16/906 |
| 2020/0021537 | A1* | 1/2020 | Oliveira ................. H04L 47/741 |
| 2020/0026575 | A1* | 1/2020 | Guim Bernat ........ G06F 9/5044 |
| 2020/0159205 | A1* | 5/2020 | Maidment ............. G06F 9/5077 |
| 2020/0327371 | A1* | 10/2020 | Sharma ................... G06N 5/04 |
| 2021/0067605 | A1* | 3/2021 | Roth ....................... H04L 67/10 |

OTHER PUBLICATIONS

WebRTC 1.0: Real-time Communication Between Browsers, W3C Candidate Recommendation Sep. 27, 2018, pp. 1-257.

* cited by examiner

SELECTING WHERE TO PROCESS DATA ASSOCIATED WITH INTERNET OF THINGS (IOT) DEVICES

TECHNICAL FIELD

The present disclosure generally relates to networking systems and methods. More particularly, the present disclosure relates to systems and methods for analyzing processing factors pertaining to data obtained from Internet of Things (IoT) devices and selecting where the data will then be processed within a network.

BACKGROUND

In general, cloud-based data centers are accessible over the Internet for providing centralized processing and storage services. However, a recent trend in the field of networking includes moving the processing power from these centralized data centers to devices located at the edge of the network. One benefit of edge computing, for example, is that the processing and storage actions can be provided closer to the end users and therefore the latency involved with the transmission of data between the end user and an edge device will typically be less than the latency involved with the transmission of the data between the end user and a cloud computing facility. Another benefit of edge computing is that an edge device normally does not incur as high of an operational expense as the expenses incurred when the processing is performed by a cloud computing device. Also, one disadvantage of cloud computing is that additional network connectivity may be required, which not only results in increased latency as mentioned earlier, but may also result in higher transmission costs and possible routing or security issues. Thus, edge computing provides a number of advantages over cloud computing.

On the other hand, there are also many benefits of cloud computing. For example, edge devices normally do not have the same computing power and available resources that may be found in a cloud-based data center. Also, because of the greater processing power, a cloud computing device may also provide greater precision in the processing of the data.

Currently, applications are essentially hard-coded to operate either at the edge or in the cloud. Thus, present systems do not have the flexibility regarding the issue of where processing will be performed. Therefore, since data can be processed either at an edge device or at a cloud device and since each of these types of devices may have certain advantages and disadvantages, there is a need to provide flexibility and assistance to an application developer regarding weighing the various factors involved with processing the application data by the different devices located through the network and then making a decision about where the application data should be processed.

SUMMARY

Systems and methods for determining where to process information within a network are therefore provided in the present disclosure. In one embodiment, a non-transitory computer-readable medium may be configured for storing a program that is executable by a processing device. The program may be configured to enable the processing device to receive information associated with an Internet of Things (IoT) device and evaluate a plurality of factors corresponding to the processing of this information so as to select where the information will be processed.

According to another embodiment, a method may include receiving data associated with an IoT device and evaluating a plurality of processing factors related to the data. Based on the step of evaluating the plurality of processing factors, the method further includes selecting where the data will be processed.

According to yet another embodiment, an edge device is provided. The edge device includes a message router, a processor, and a memory configured to store a program. The program, when executed, causes the processor to receive data associated with one or more IoT devices and evaluate a plurality of factors related to the processing of the data. The program also causes the processor to decide where the data will be processed based on the plurality of factors. Depending on the decision of where the data will be processed, the message router is configured to send the data to the processor for local processing or send the data to a cloud network device for remote processing.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Figure 1:
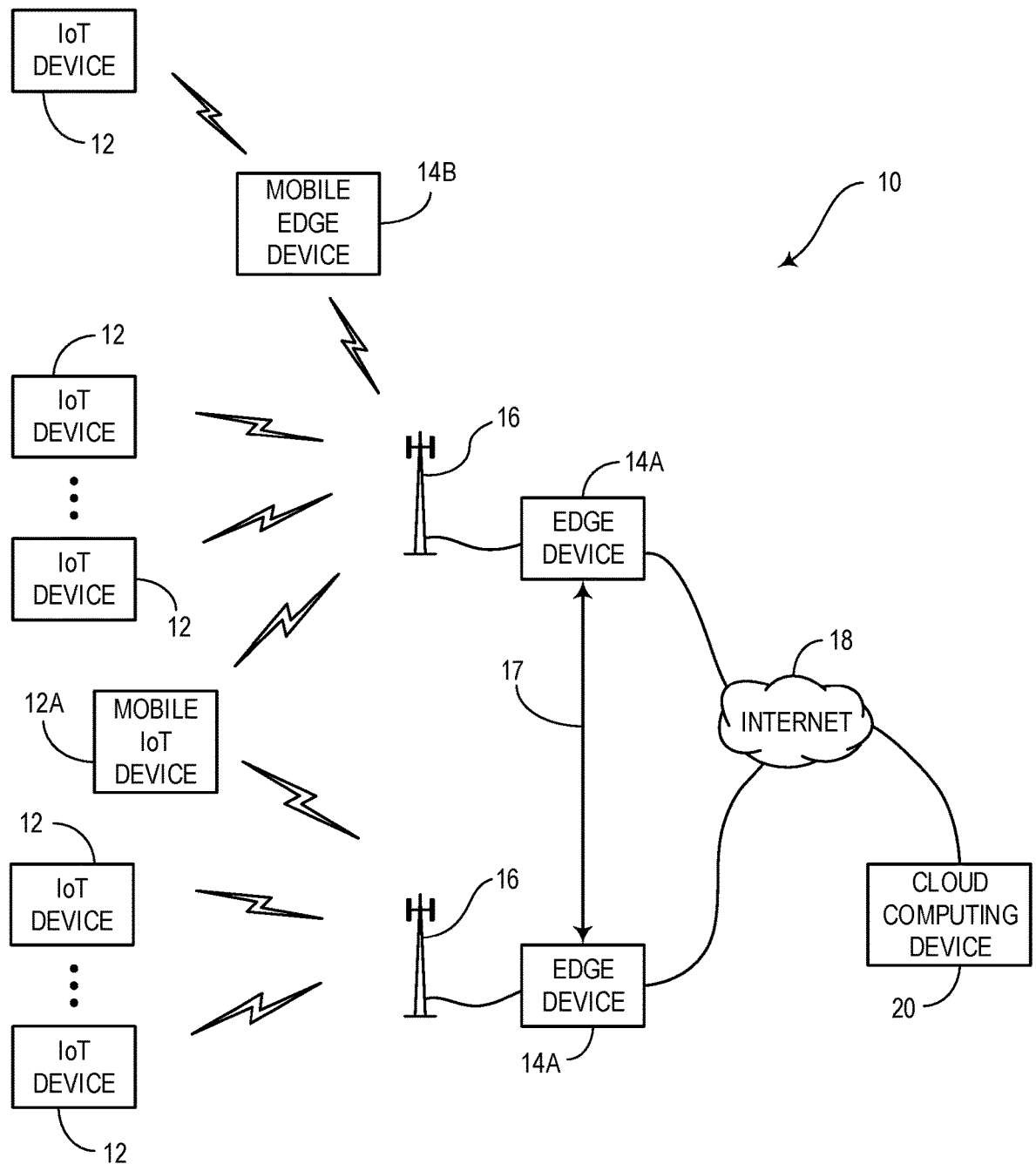
FIG. 1 is a block diagram illustrating a telecommunications system configured at least for processing Internet of Things (IoT) data, according to various embodiments of the present disclosure.

Internet of things (IoT) is expected to challenge existing cellular networks due to the high number of IoT devices being added to the networks. Some of these IoT devices may require low-latency, low-cost, end-to-end performance. Because of the changes in the way these networks are structured and utilized, one concern for IoT applications is the issue of where the information (collected by related IoT devices) should be processed. Since edge resources may be constrained, it is likely that not all information can be processed at the edge. Similarly, not all information can be processed in the cloud, since resources in the cloud are also constrained and data transfer to cloud computing devices introduces a certain level of latency.

Conventionally, the separation of software applications limits the amount of statistical multiplex available on an edge device, which can introduce inefficiencies and raise the processing cost. Also, service chaining needed for linking multiple components of IoT applications can raise the complexity and cost of network devices. Another drawback of conventional systems is that the lack of visibility in the network operation makes it difficult to enable developers of edge applications to manage their resource usage and costs of edge computing and cloud computing. Also, network routing may be forced on the edge applications in conventional systems without raising the complexity of a mobile network that may already be saturated. Thus, conventional systems essentially limit mobile applications to exist on the edge.

The present disclosure relates to systems and methods for overcoming these issues of conventional systems. Since various service providers have pushed many of their data processing resources toward the network edge and closer to (i.e., fewer hops from) the end users, a newly created issue has arisen with respect to where data processing should take place within this adaptive network. By considering various factors involved with processing the application data, such as data that may be obtained by an IoT device, the processing factors can be weighed or analyzed by the systems and method of the present disclosure in order to select where the IoT-related data can be processed. Therefore, the present disclosure addresses the shortcomings of the conventional systems by reducing the network complexity, such as by allowing the application layer to route message from IoT devices to the device or devices on which their respective IoT application software resides. Also, in the present disclosure, applications at the edge receive information that they can use to decide where the data will be processed, using cost, latency, and/or other processing factors.

For example, one processing factor may be a comparison of the costs of processing data at the network edge versus the costs of processing that same data in the cloud. Particularly, the decision may be made to have the IoT-related data processed by one of multiple edge devices or one or multiple cloud computing devices. The present disclosure further describes a message routing system for routing messages associated with the IoT-related data to the device selected for performing the processing functions.

The processing decision analysis can be performed at the edge and can include software code running on the IoT applications themselves. In other implementations, the software for analyzing the decision of where to process data can be included in one specific analysis application on an edge device for making the processing decision for one or more IoT applications. The analysis software for determining the processing location can be designed for use by third party developers to allow the developers to develop applications on the edge devices.

FIG. 1 is a block diagram showing an embodiment of a telecommunications system 10 having various network resources dispersed through a network for processing data. In particular, the telecommunications system 10 may be configured for at least processing IoT data. The telecommunications system 10 may include systems and methods, as described in the present disclosure, for reducing the network complexity by disseminating IoT data to various devices for processing as needed. The telecommunication system 10 may perform network slicing procedures for optimizing the network resources by intentionally utilizing the network in a judicious manner to minimize costs and/or optimizing other aspects by considering one or more factors that may be involved in the processing of the IoT data.

The telecommunications system 10 handles data (e.g., sensor data) obtain with respect to IoT devices 12 and processes the data according to various IoT software running within the telecommunications system 10. The IoT software may include any number or type of program for processing and analyzing the IoT data (e.g., sensor data) and for determining control signals for controlling various components in response to analyzed conditions with respect to the IoT devices 12. According to various embodiments, the telecommunications system 10 may include multiple types of IoT applications.

The IoT devices 12 may include various types of devices for sensing or monitoring various parameters and may be arranged in association with or connected to vehicles, drones, livestock, machinery, home appliances, or other objects. The use of the IoT devices 12 may involve IoT applications for consumers, commercial entities, industrial entities, or other entities. The various IoT systems may be used for transportation (e.g., connected vehicles), home automation, smart home systems, medical monitoring, manufacturing, agriculture, or even hybrid systems involving multiple fields (e.g., sensing the location or migration of animals that may be near roadways in order to alert drivers driving their vehicles along those roadways).

According to further examples, the IoT software may be configured to monitor travel data obtained with respect to a number of connected vehicles (CVs) and determine control signals for providing instructions to a human driver of the vehicles or for providing automated driving controls if the CVs are self-driving or autonomous vehicles. Another example of IoT software may include monitoring the operating conditions of industrial machinery and, as a result of the monitored conditions, perform certain actions such as scheduling maintenance, providing maintenance instructions, ordering replacement parts, or performing other responsive type actions as needed. Multiple types of other monitoring and controlling system using IoT-related data may be realized within the telecommunications system 10.

The IoT software for performing various IoT-related sense/control operations may be instantiated on one or more devices within the telecommunications system 10. For example, the IoT applications may be instantiated on one or more edge devices (depending on where the IoT devices 12 may normally be located near the network edge) and/or on one or more cloud devices, thus allowing various devices to process the IoT data. In this sense, processing of IoT-related data can be performed at the edge of a network or in the cloud.

However, there may be certain advantages and disadvantages, as mentioned above, of processing data at the edge and other advantages and disadvantages of processing in the cloud. For instance, because IoT devices 12 will typically be located closer to edge devices than to cloud processing devices, there will typically be less latency with processing the IoT data at the edge devices, which is one benefit of edge computing. Also, edge computing may be more advantageous in that the cost of utilizing a cloud device may typically be more expensive than utilizing an edge device. Conversely, a cloud device may have more processing power than an edge device and can therefore provide more precise processing, which is a benefit of cloud computing. Also, cloud computing may typically include greater resource availability.

The various embodiments of the present disclosure are configured to analyze these various factors of processing IoT data at the network edge versus processing the IoT data at a cloud computing device. By analyzing and comparing the various factors (e.g., computing costs, availability of resources, latency, among others) for edge processing and cloud processing, a determination can be made to select where processing will be performed. In some embodiments, the systems and methods of the present disclosure may include dividing the IoT code such that some code can be executed by an edge device whereas other code can be executed by a cloud computing device.

Also, it should be noted that the decision of where to process IoT data may either be a one-time process or an ongoing process. For example, an application developer may utilize the data processing decision during the development of an application. In this case, the application may be set such that it utilizes the network resources in a consistent manner, unless it is reprogrammed differently at a later time. According to another implementation, the data processing decision may be made at certain intervals (e.g., once a week, once a month, once a year, or based on other periods). In this case, the application can analyze the present landscape to see if the network has been altered in a way that may change the data processing decision. Furthermore, the changeable decision may utilize historic information for making future decisions about where the processing may be performed.

The telecommunications system 10 may be configured for both wireless and wired communication. Returning to FIG. 1, the telecommunications system 10, as shown, includes a plurality of IoT devices 12, which can be configured as relatively stationary devices or mobile devices. For example, relatively stationary IoT devices 12 may include sensors or other components for sensing or monitoring parameters associated with one or more objects located at a specific location (e.g., for monitoring machines in a factory, monitoring home appliances within a home, etc.). The mobile IoT devices 12 may include sensors or other components for sensing or monitoring parameters associated with one or more objects that may be configured to move (e.g., drones, connected vehicles (CVs) travelling along certain route or within a specific area, animals or livestock that may tagged with location tracking devices, etc.).

Each of the IoT devices 12 may be configured to wirelessly communicate with one or more network edge devices 14, which may include relatively stationary edge devices 14A and mobile edge devices 14B. The network edge devices 14, which may also be referred to as edge devices or edge networking devices, may represent entry points where end users can connect to a service provider network (e.g., cellular phone network), enterprise network, or other types of networks. In some embodiments, each edge device 14A may be connected to or may include one or more wireless communication devices 16. The edge devices 14A of the present disclosure may represent an edge or end of a first network (e.g., a cellular network or other wireless network) and an edge or end of a second network (e.g., the Internet or other wired network).

The mobile edge devices 14B may represent an intermediate mobile node between the IoT devices 12 and the wireless communication apparatus 16. The mobile edge device 14B may include user equipment (UE), such as a mobile handset, which may operate using 5G, 4G, or other wireless protocol. In some respects, the mobile edge device 14B may be considered to be a first evolved NodeB (eNB) positioned between the IoT device 12 and an eNB of the wireless communication apparatus 16. Also, the mobile edge device 14B may be a cell phone, mobile phone, or smart phone, or may be another type of wireless communication device positioned on a vehicle or drone. The mobile edge device 14B, in some embodiments, may also be a wireless sensor in a smart device or drone, a wireless relay, or other device for forwarding sensed parameters of the IoT device 12 to the communication apparatus 16.

The wireless communication devices 16 may be configured as antennas, cellular towers, satellites, or other wireless transmitting and receiving devices. According to various embodiments, the telecommunications system 10 may be configured to operate over a 5G cellular network for transmitting signals between the IoT devices 12 and the wireless communication devices 16 (e.g., 5G cell towers, antennas, or dishes).

In addition to transmitting and receiving equipment, the communication apparatus 16 may include other hardware of a base station or cellular station, such as eNB hardware or other equipment for entry to a service provider network. The corresponding edge device 14A may represent a cellular service provider device or a third party device for utilizing the cell station equipment, and therefore utilize the IoT data received through the wireless communication apparatus 16 to perform the IoT-related applications described herein.

The stationary edge devices 14A may include routers, switches, multiplexers, etc. for enabling access to a network (e.g., the Internet 18). Although the network edge devices 14A are illustrated in the embodiment of FIG. 1 as being configured at edges of the Internet 18, it should be understood that, in other embodiments, the network edge device 14A may enable user access to other networks, such as enterprise networks, wide area networks (WANs), etc.

One or more of the IoT devices 12 (e.g., a mobile IoT devices 12A) may be configured to communicate with more than one network edge device 14A via more than one communication apparatus 16, such as in the example of a connected vehicle (CV) travelling past multiple cell towers 16 where the CV may be within range of and interact with a first network edge device 14A during one time period, be within range of and interact with both the first and a second network edge devices 14A during another time period, switchover to interact with the second network edge device 14A when out of range of the first network edge device 14A during yet another time period, and so on.

In some embodiments, one or more of the IoT devices 12 may be connected directly to an edge device 14A, thereby bypassing the respective communication apparatus 16 altogether. Thus, these IoT devices 12 may be positioned in the network between the eNB 16 and the edge device 14A.

The network edge device 14A may be a multi-access edge computing (MEC) device or server utilizing 4G, 5G, etc. In some cases, the network edge device 14A may be a cellular provider server at a cell station, a server (e.g., a third party server) connected to a cellular tower to utilize cell service provider equipment at a cell station, a "pizza box" type device (e.g., a Ciena 3926m box) at a cell station, a "mini-data center" at a cell station, etc. The edge device 14A may operate on a wireless network on one side, while operating on a wired network on the other side. For example, the network edge device 14A may receive 5G data regarding IoT-related sensor information and may be configured to perform various processing and storage functions at the edge device 14A or forward the data through the Internet 18 for remote processing. According to other embodiments, the network edge device 14A may be a virtual machine.

In some implementations, one of the edge devices 14A might not be configured with the appropriate IoT software application for processing certain IoT data. In this case, the edge device 14A may forward the IoT data to a nearby edge device 14A that does include the IoT application. Therefore, the first edge device 14A that initially receives the IoT data may include a routing strategy for routing the IoT data to the appropriate edge device 14A. For example, the edge devices 14A located near each other may utilize a communication channel 17 for point-to-point relaying of information, which may exist outside the Internet 18. Although not shown in FIG. 1, the edge devices 14A may further be connected directly to other edge devices 14A using additional communication channels for communicating the IoT data among various edge devices 14A as needed to provide IoT data to the proper edge device 14A that can process the data.

The communication channels 17 enable application layer mobility between adjacent edge devices 14A. As described in more detail below, the edge devices 14A may include message routers, which may be configured, among other things, to forward IoT messages from one edge device 14A to another.

A sensor may send IoT messages to an IP address of the forwarding message router. An anchor message router has the application layer information required to route messages to the IoT application at the edge device 14, which may be on a device different from the anchor message router. The forwarding message router has the application layer information required to route an IoT message from the IoT device to its anchor message router. Message routers may employ dynamic routing protocols (e.g., AODV, DSR) to exchange information about the location of mobile IoT sensors 12A. The anchor message router and the forwarding message router are logical entities and may be the same physical entity. Message routers have access to the network data and know which sensors are attached to their network edge device 14. This information can be exchanged with other message routers.

Also, the message routers may include setting the forwarding message router IP address. For example, IoT sensors may be informed by a message router of the IP address of a new message router if the current message router finds from the network information that the IoT device 12 is closer to the new message router (i.e., hand-off protocol). The IoT sensor may use the same destination address and the network may manage the mobility on its behalf by changing the forwarding tables at the edge device 14 to send its packets to the real address of its forwarding message router (e.g., using P4).

The communication along communication channels 17 can be performed when it is decided that the IoT data will be processed at one of the edge devices 14A. In some embodiments, a decision may be made to process the IoT at one of multiple possible edge devices 14A where IoT applications are instantiated. When it is determined that the IoT data will be processed in the cloud, the edge device 14A forwards the data to one or more cloud computing device 20 via the Internet 18.

The mobile edge device 14B may be connected to the network wirelessly and may be user equipment (UE) that hosts in-network software or out-of-network software. With the intermediate mobile edge device 14B, there will be two hops from the IoT devices 12 to the wired network (e.g., Internet 18). In this sense, the edge is split across two devices. The first hop could simply be a forwarding hop or could be a hop where processing can occur. Similarly, the second hop could simply be a forwarding hop or could be a hop where processing can occur. The application layer code can therefore decide to process message at the first hop, the second hop, or both, depending on where the IoT code is able to run. In the case of making a processing decision in the multiple hop system, the application may use the total cost of processing and networking for different scenarios (e.g., first hop only, second hop only, first and second hops, cloud only, or other scenarios). In some embodiments, the application may pick the one with the least cost or price.

The cloud computing device 20 may be located at any point within the network 18 and may be remote from the network edge devices 14 or the local IoT devices 12 that be located near the network edge devices 14. The cloud computing device 20 may be associated with any suitable cloud computing platform, such as Amazon Web Service (AWS) or other service. The cloud computing device 20 may be a cloud-based data center for performing various functions on demand or as needed, such as the functions normally associated with Processing-as-a-Service (PaaS) actions, Computing-as-a-Service (CaaS) actions, Infrastructure-as-a-Service (IaaS) actions, etc.

Compared with the network edge devices 14, the cloud computing device 20 may include greater processing power to thereby provide higher precision and may include greater storage capacity for storing data. However, because of the potential distance and number of hops from the network edge devices 14 to the cloud computing device 20, there will naturally be a higher latency when data processing occurs at the cloud computing device 20. Also, the processing costs incurred from disseminating data processing functions to the cloud computing device 20 are typically higher than if the network edge device 14 processes the data locally (e.g., at the network edge device 14 itself).

According to one example in which the network edge devices 14A can host application software, suppose one of the IoT devices 12 is associated with a drone connected wirelessly to a first network edge device 14A via a first wireless communication apparatus 16 (e.g., the elements 14A and 16 shown near the top of FIG. 1). And suppose the drone is also be connected wirelessly to a second network edge device 14A via a second wireless communication apparatus 16 (e.g., the elements 14A and 16 shown near the bottom of FIG. 1). Also, suppose, in this example, that Application 1 software is only hosted on the first (top) network edge device 14A. The second (bottom) network edge device 14A may be provisioned to forward application layer messages of Application 1 to the first (top) network edge device 14A, where its software is residing. The software stack on each edge device 14A may be provisioned by a network orchestration engine (e.g., a message router as described below), which may automate the instantiation of required software on each network edge device 14 as needed based on where the drone may operate.

Another example according to the embodiment of FIG. 1 may include an IoT application that collects information on a factory floor where there are many sensors attached to machines performing different tasks. The collected information may be processed locally to save on data transmission costs or to ensure low-latency responses.

Yet another example may be an animal detector for rural roads where many cameras (or other sensors) may collect information about the wildlife passing through the area. Information regarding the sightings of large animals (e.g., deer, moose, etc.) may be passed on to drivers in the area to enhance safety. The collected information can be merged from multiple sensor applications to detect the direction that the animals are travelling, and this information can be displayed on roadside display boards in a timely fashion to timely pass the information on to the drivers. In this example, immediate response to animal sightings may be desired, such that some or all of the processing of the sensor information may be handled by an edge device 14.

Figure 2:
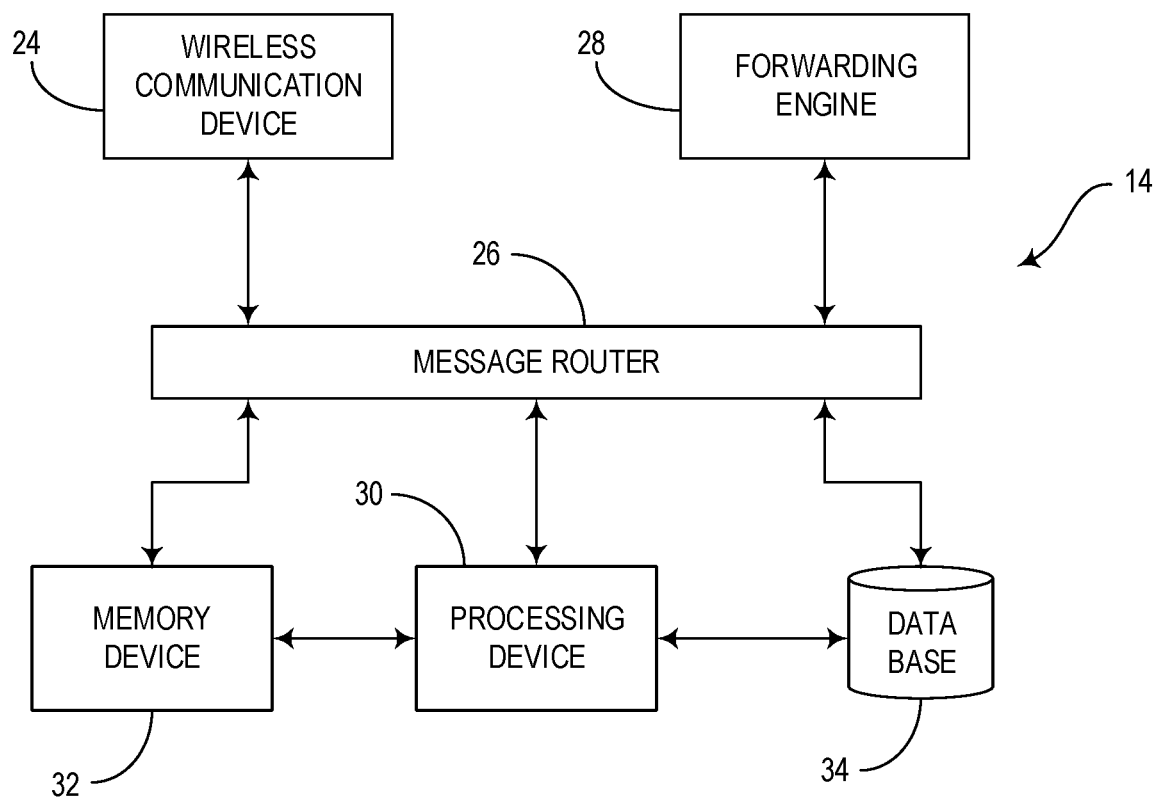
FIG. 2 is a block diagram illustrating a network edge device of the telecommunications system of FIG. 1, according to various embodiments.

FIG. 2 is a block diagram showing an embodiment of one of the network edge devices 14 of the telecommunications system 10. The network edge device 14 of FIG. 2 may be a mobile edge device (e.g., mobile edge device 14B) or a relatively stationary edge device (e.g., edge device 14A) connected to a cellular network. In some respects, the network edge device 14 may be configured as a resource broker, resource manager, or resource controller for utilizing the various processing resources on the network and for determining possible ways of utilizing the resources on the network edge and in the cloud. This determination of how to utilize resources may include optimizing the value of processing data at one (or both) devices and/or attempting to achieve other goals (e.g., meeting service level agreements (SLAs), disseminating based on resource availability, etc.). As a partitioning manager or partitioning controller, for example, the network edge device 14 can also arrange network partitions for utilizing the network resources according to various criteria, such as to minimize cost, reduce latency, utilize available resources, meet certain processing precision expectations, etc.

According to various embodiments, the network edge device 14 illustrated in FIG. 2 includes a wireless communication device 24 configured for wirelessly receiving data or messages, such as application layer IoT data or messages from the IoT devices 12. In some embodiments, for example, the wireless communication device 24 may include at least some portions of the wireless communication apparatus 16, such as an antenna, a cell tower, or other eNB equipment. In other embodiments, the wireless communication device 24 may simply be connected directly or indirectly to the wireless communication apparatus 16 for receiving the application layer IoT data. In the case where the edge device 14 is configured as the intermediate mobile edge device 14B, the wireless communication device 24 may be configured for two-way communication to wirelessly receive IoT data and/or to wirelessly transmit the IoT data to a downstream edge device 14A via the wireless communication apparatus 16.

Application layer signals received by the wireless communication device 24 may then be forwarded to a message router 26 configured to deliver at least a portion of the IoT data or messages to a local processor for processing the data locally and/or to deliver at least a portion of the IoT data or messages to a forwarding engine 28, which is configured to thereby forward the IoT data or messages to a cloud computing devices (e.g., cloud computing device 20) for remote processing. In some embodiments, the message router 26 and forwarding engine 28 may be combined into one device. The message router 26, in conjunction with decision processing functions (described below), is configured to orchestrate the network processing resources as needed to optimize these resources for performing data processing of the IoT-related information.

The message router 26 receives the IoT data on the application layer and is configured to route the application layer data to various IoT applications as needed for executing the processes of the IoT software. When it is determined that IoT data will be processed remotely, the message router 26 is configured to encapsulate the IoT message into Internet Protocol (IP) layer packets and provide the packets to the forwarding engine 28 for wired communication on the Internet 18. The forwarding engine 28, in some embodiments, may be configured for communication with another edge device 14A, such as through communication channel 17. The forwarding engine 28 may be configured as a network interface, a router, an Ethernet port, or other suitable device for communicating the IoT messages to various external devices.

Message layer routing of the message router 26 may be performed by any suitable product, such as RabbitMQ, Kafka, Redis, Apache Spark, etc. The message layer is established by exchanging encryption details with all members of the layer. Encrypted connections are established by the message router 26 to any suitable message router transport layer technologies (e.g., UDP, TCP, HTTP/REST). The IoT devices 12 can send messages to the message router 26, which are encapsulated into IP layer packets to traverse the wired network (e.g., Internet 18) outside the bounds of the wireless network (e.g., which may include IoT devices 12, wireless communication devices 16, and portions of the edge devices 14A).

The message router 26 may initiate IP routing in a Virtual Private Network (VPN). The forwarding engine 28 may be a software based forwarding engine in user space (e.g., oVS, Kubernetes/Docker networking, etc.). IP packets intended for end applications are encapsulated into IP layer packets to run over the wired network (e.g., Internet 18) and are decapsulated at the network edge device 14 before being dropped into user space.

Furthermore, the network edge device 14 of FIG. 2 may also include a processing device 30, a memory device 32, and a database 34. The processing device 30 may operate in cooperation with the message router 26 to determine whether the IoT data is to be processed locally or remotely and to arrange for the transport of the IoT data based on the decision of where the data is to be processed. In some embodiments, if the IoT data is to be shipped out, the message router 26 may be configured to determine which one of multiple cloud computing devices 20 the data is to be sent to.

The processing device 30 may be configured to conduct various processing functions, including, for example, the function of locally processing the IoT data that is received from one or more of the IoT devices 12. This processing may include utilizing IoT software, firmware, programs, applications, or other forms of computer code, which may be stored in the memory device 32. The processing device 30 may perform various processing steps, computing, executing algorithms, etc., to perform functions related to the specific IoT devices 12 and associated software. In some cases, the results of the processing may be stored in the memory device 32 and/or in the database 34. The database 34 may be configured to expose the IoT data to IoT applications stored in the memory device 32.

According to various embodiments, the processing device 30 may include one or more generic or specialized processors, such as microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), or other suitable logic processing components. The memory device 32 may be configured to store program instructions (including software and/or firmware), as mentioned in more detail below with respect to FIG. 3. The processing device 30 may be configured to execute the program instructions alone or in conjunction with certain non-processor circuits to thereby perform at least some of the functions of the methods and/or systems described herein.

Alternatively, some or all functions or processes of methods described in the present disclosure may be implemented by a state machine that has no stored program instructions or by one or more Application Specific Integrated Circuits (ASICs), in which each function or some combinations of certain of the functions are implemented as custom logic or circuitry. For some of the embodiments described herein, a corresponding device configured in hardware and/or software/firmware can be referred to as circuitry or logic configured to or adapted to perform a set of operations, steps, methods, processes, algorithms, functions, techniques, etc. on digital and/or analog signals as described herein for the various embodiments.

The edge device 14 may include input/output (I/O) devices (not shown) or interfaces used to receive user input from and/or for providing system output to one or more devices or components. User input may be provided via, for example, a keyboard, touchpad, a mouse, or other suitable input device. System output may be provided via a display device, a printer, or other suitable output device. The I/O interface devices may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, a universal serial bus (USB) interface, and/or other suitable components.

The message router 26 may also include or be associated with a local interface or bus interface, which may be, for example, but not limited to, one or more buses or other wired or wireless connections, as is known in the art. The message router 26 may have additional elements, which are omitted for simplicity, such as controllers, buffers (caches), drivers, repeaters, and receivers, among many others, to enable communications. Further, the message router 26 may include address, control, and/or data connections to enable appropriate communications among the aforementioned components.

Information may come from different types of sensors associated with the IoT devices 12 and may require processing by different IoT software at the network edge to ensure low-latency and reduce cloud connectivity and computing costs. However, this situation may create routing and security problems at the edge. If the IoT application layer software were to be chained in such as fashion that a separate service function chain would be used for each application, the routing tables for such an arrangement would be quite large. Also, establishing encrypted tunnels would increase the complexity of managing the software on the network. Thus, a simpler and more cost-effective approach, according to the embodiments of the present disclosure, is to transfer some of the traditionally low-level networking functions into the application domain, thus keeping the network simple and allowing the IoT applications to manage their routing and security. The present disclosure therefore provides an application layer IoT message routing system to reduce the network complexity of supporting multiple IoT applications.

As mentioned above with respect to FIG. 1, the IoT devices 12 connect to the cellular network with wireless connections (e.g., 4G or 5G) and the network edge devices 14 host IoT applications at the edge. The edge devices 14 also host virtualized wireless termination functions (e.g., eNBs), which enable IoT traffic to exit the wireless domain locally at the edge in order to be processed by the application software residing in the memory device 32 of the edge device 14. The wireless communication device 24 is configured to forward application traffic to the message router 26, which can then route the messages in the application domain for delivery to the processing device 30 for local processing or to the forwarding engine 28 for forwarding the application layer IoT messages to the cloud computing device 20.

The forwarding engine 28 may be configured as a network interface that may be used to enable the edge device 14 to communicate over the telecommunications system 10, such as over the Internet 18 or other Wide Area Network (WAN), Local Area Network (LAN), or other type of network. The forwarding engine 28 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The forwarding engine 28 or network interface device may include address, control, and/or data connections to enable appropriate communications on the network.

In some embodiments, the network may essentially act as another IoT application residing at the edge. The message router 26 may route the application code to the database 34 for local storage, allowing the information to be accessed as needed by the locally stored IoT applications that may process this information. Also, the databases 34 of adjacent edge devices 14 may be linked together to create a shared database that can share the IoT information with multiple edge devices 14. In this way, the edge device 14 can utilize the relevant IoT data stored in its respective database 34 or stored in the shared database for processing the IoT data according to software functions of the locally stored version of the IoT application. For example, the edge devices 14 may utilize the dedicated communication channel 17 or other wired or wireless communication device for sharing information stored in the respective databases 34.

Figure 3:
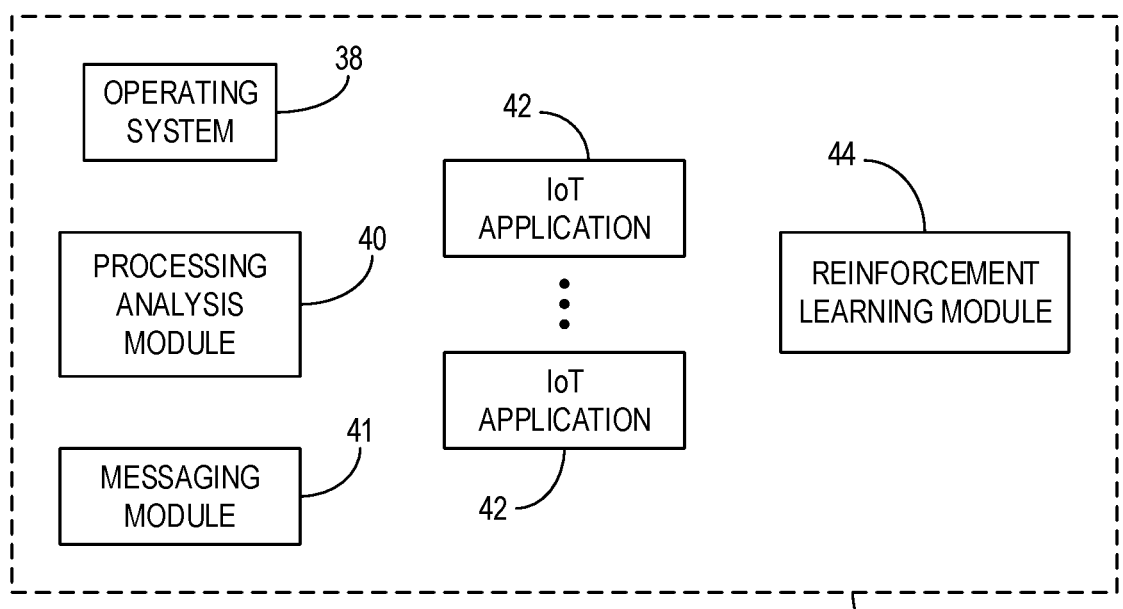
FIG. 3 is a block diagram illustrating a memory device of the network edge device of FIG. 2, according to various embodiments.

FIG. 3 shows a block diagram of an embodiment of the memory device 32 of the network edge device 14 shown in FIG. 2. The memory device 32 may include an operating system 38 and a number of other applications. For example, the memory device 32 may include one or more of a processing analysis module 40, a messaging module 41, one or more IoT applications 42, and a reinforcement learning module 44. In some embodiments, the processing analysis module 40 may be incorporated in each of the IoT applications 42 in order to analyze the specific processing factors for the respective program to make decisions about where the IoT data will be processed for the respective IoT application 42. According to other embodiments, the memory device 32 may include one instantiation of the processing analysis module 40, which can then determine processing dissemination for each of the one or more IoT applications 42.

The processing analysis module 40 is configured to analyze various factors associated with the processing of IoT data to determine where the IoT data will be processed. In some embodiments, the processing analysis module 40 may be configured to enable the processing device 30 to analyze data from one or more IoT devices 12 associated with an IoT application 42 and evaluate a plurality of processing factors related to the IoT data. For example, the processing factors may include various factors associated with processing the IoT data at the network edge device 14 and various factors associated with processing the IoT data at the cloud computing device 20. Based on this evaluation of the processing factors, the processing analysis module 40 allows the processing device 30 to select where the IoT data will be processed. Accordingly, the message router 26 is configured to deliver the data to the selected device for processing the data. The processing analysis module 40 can therefore be utilized by an application developer when developing an IoT application 42. The results of the analysis can be incorporated into the IoT applications 42 for establishing how IoT data is to be handled and where it will be sent for processing.

Also, the results of the analysis for determining how IoT data is handled can be stored within the code of each of the IoT applications 42 themselves or stored in the database 34. The processing analysis module 40 may analyze the network collected information (e.g., IoT data) and utilize knowledge of the connectivity of the network, computing prices, and service level requirements. Based on this analysis, the processing analysis module 40 can determine where the data is to be processed. Methods with respect to the processing analysis module 40 are described in more detail below with respect to FIGS. 8 and 9.

Some of the analyzed factors associated with processing IoT data may include cost, latency, processing precision, and other factors. As mentioned above, the decision regarding what code is to be processed locally on the edge and what code is to be processed remotely on the cloud can be made only once, whereby this one decision can then be used indefinitely thereafter. Alternatively, the decision can be done on a case-by-case basis, repeatedly, and/or periodically according to various embodiments, which allows changes to the utilization of the network resources in light of temporary or permanent changes within the network itself (e.g., addition of new edge resources, addition of new cloud resources, temporary service issues with the current edge resources or cloud resources, etc.).

Additionally, the messaging module 41 may be associated with routing the IoT messages to either a local processor (e.g., processing device 30) or a cloud-based device (e.g., cloud computing device 20). The messaging module 41 may also be configured to operate in conjunction with an Application Processing Interface (API).

The memory device 32 may further include one or more IoT applications 42. Each IoT application 42 may be configured with software code for enabling the processing device 30 to execute a program associated with a specific IoT device 12 or a specific group of IoT devices 12. Some IoT applications 42 may be instantiated on multiple edge devices 14 to allow processing of the IoT data at any of these edge devices 14 if that device is selected to process the data there. Therefore, each edge device 14 may include any IoT applications 42 as needed in the network. If an IoT application 42 is not instantiated on an edge device 14 that receives the IoT message, the receiving edge device 14 can then forward the IoT message to an edge device 14 that includes the respective IoT application 42. The IoT message, in this example, can be forwarded over the communication channel 17 shown in FIG. 1.

According to one example of the IoT applications 42, a vehicle travel application may be part of a driving control system that monitors the operating conditions (e.g., location, speed, direction, etc.) of a plurality of connected vehicles (CVs). In response to analyzing the operating conditions, the application 42 may then control the self-driving vehicles or provide driving instructions or warnings to the drivers of human-operated vehicles. In another example, one of the IoT applications 42 may be part of a factory control system that monitors the condition of various machinery operating at a factory and provides control signals for adjusting the operating parameters of the machinery as needed to meet certain manufacturing criteria.

The processing analysis module 40 may be further configured to place the IoT applications 42 in strategic locations on the network, based on where the IoT devices 12 may normally be used. In other embodiments, the location of devices (e.g., edge devices 14, cloud computing devices 20) for hosting the IoT applications 42 can be made by either the processing analysis module 40 or by another network resource management process. According to this network management process, the processing analysis module 40 may be configured to monitor network performance to decide if the IoT application software 42 should be instantiated in new locations, or even removed from existing locations. The network management in this regard may include deciding on locations based on system performance and to better balance the load on each resource. The processing analysis module 40 may also assign costs of resources to assist the application with making decisions.

In addition to these applications, the memory device 32 may be configured with a reinforcement learning module 44. The reinforcement learning module 44 may include code (e.g., neural network code) for calculating future selection criteria based on historic data. More specifically, based on various processing factors (e.g., cost, availability, latency, etc.) of processing IoT data at the network edge and in the cloud and the actual service quality results to that processing, the reinforcement learning module 44 may be configured to recognize various patterns in the data and results to determine how future selections (regarding where IoT data is processed) can be made. The reinforcement learning module 44 can use machine learning or artificial intelligence (AI) to analyze various scenarios for determining optimum dissemination strategies for handling IoT data. In some embodiments, the reinforcement learning module 44 may be able to predict or forecast how IoT data should be handled in order that a proper selection can be made.

Regarding the reinforcement learning module 44, a policy may be mapped from network information time-series to one of several choices using a deep-neural network. The network may be trained to recognize the pattern in the time-series and can map it to the policy. The policy may be processed locally or in the cloud. The advantage of this approach is that the time-series may contain information about future processing requests. Pattern recognition may correlate to past information with policies that work best for future times.

Pattern detection or recognition is enabled by the machine learning processes of the reinforcement learning module 44. For an industrial example, pattern detection may be used for analyzing collected time-series and searching for patterns associated with indicators of degrading performance of machinery, thereby requiring further action by a factory operator. For the animal detection example, pattern detection may include classifying images (e.g., animal present or no animal present) from the captured information.

Pattern detection may be performed with trained machine learning models of the reinforcement learning module 44 and can be performed either in the edge device 14, or, as mentioned below, may also be performed in the cloud. If performed at the edge, the models may be smaller in size to match the available compute resources, which may make them less precise. To enable better performance, the reinforcement learning module 44 (and/or the processing analysis module 40) may be able to determine, at the edge, if the edge device 14 should process the data locally or send the data to the cloud for remote processing by the cloud computing device 20.

The memory device 32 may include any types of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory device 32 may incorporate electronic, magnetic, optical, and/or other types of storage media. The memory device 32 may have a distributed architecture, where various components are situated remotely from one another, but can be accessed by the processing device 30. The memory device 32 may include non-transitory computer-readable storage media for storing one or more software programs. Each of the software programs may include an ordered listing of executable instructions for implementing logical functions. The software in the memory device 32 may further include a suitable operating system (O/S) 38. The O/S 38 may essentially control the execution of other computer programs and provide scheduling, input/output control, file and data management, memory management, communication control, and other related services. The one or more programs may be configured to implement the various processes, algorithms, methods, techniques, etc. described herein.

The memory device 32 may further include a data store (e.g., database 34) for storing data. The data store or database 34 may include any types of volatile memory elements (e.g., RAM, DRAM, SRAM, SDRAM, etc.), nonvolatile memory elements (e.g., ROM, hard drive, tape, CDROM, etc.), and combinations thereof. Moreover, the data store or database 34 may incorporate electronic, magnetic, optical, and/or other types of storage media. In one example, the data store or database 34 may be an internal hard drive connected to the processing device 30. Additionally, in another embodiment, the data store or database 34 may be located external to the edge device 14, such as, for example, an external hard drive connected to I/O interface devices (e.g., SCSI or USB connection). In a further embodiment, the data store or database 34 may be connected to the edge device 14 through a network.

Therefore, according to various embodiments of the present disclosure, an edge device (e.g., edge device 14A) is provided. In particular, the edge device 14A may include a message router (e.g., message router 26), a processor (e.g., processing device 30), and a memory (e.g., memory device 32) configured to store a program (e.g., the processing analysis module 40). The program 40, when executed, causes the processing device 30 to receive data associated with one or more IoT devices and evaluate a plurality of factors related to the processing of the data. The program 40 also causes the processing device 30 to decide where the data will be processed based on the plurality of factors. Depending on the decision of where the data will be processed, the message router 26 is configured to send the data to the processing device 30 for local processing or send the data to a cloud network device (e.g., cloud computing device 20) for remote processing.

More specifically, the message router 26 may be configured to deliver the data in an application layer message. The application layer message may be delivered to the processing device 30 for local processing or delivered to the cloud computing device 20 for remote processing. The edge device 14 may further comprise wireless network communication elements and wired network communication elements. For example, the edge device 14 may be configured as a wireless network base station, a server connected to a wireless network base station, a vehicle, or a 5G User Equipment (UE) device running a third party IoT application. The factors mentioned above may include at least pricing factors and latency factors. The memory device 32 may be further configured to store one or more IoT applications 42, wherein the message router 26 may be configured to route application layer messages associated with the received data to the one or more IoT applications 42.

The present application also describes a non-transitory computer-readable medium configured for storing a program (e.g., the processing analysis module 40) that is executable by a processing device (e.g., processing device 30). The program may enable the processing device 30 to receive information associated with an IoT device and evaluate a plurality of processing factors related to the information to select where the information will be processed.

The non-transitory computer-readable medium may be configured such that the program further enables the processing device 30 to select where the information will be processed by determining whether the information will be processed at the network edge device 14 or at the cloud computing device 20. The cloud computing device 20 may be in communication with the network edge device 14 via the Internet 18. The program may further enable the processing device 30 to utilize a message router 26 instantiated on the network edge device 14 to deliver the information in an application layer message to the processing device 30 for processing or to the cloud computing device 20 for processing. The program further enables the processing device 30 to evaluate the plurality of processing factors by determining a local cost estimate defined by a cost to have the network edge device process the information and determining a cloud cost estimate defined by a cost to have the cloud network device process the data. The processing device 30 also runs the program 40 to select where the data will be processed by comparing the local cost estimate and the cloud cost estimate and selecting where the data will be processed based on the lowest cost estimate. The processing factors may include pricing factors and latency factors. Furthermore, the processing factors may include at least one of availability factors, performance requirement factors, Quality of Service (QoS) factors, Service Level Agreement (SLA) factors, bandwidth factors, resource factors, processing precision factors, and computing power factors.

Figure 4:
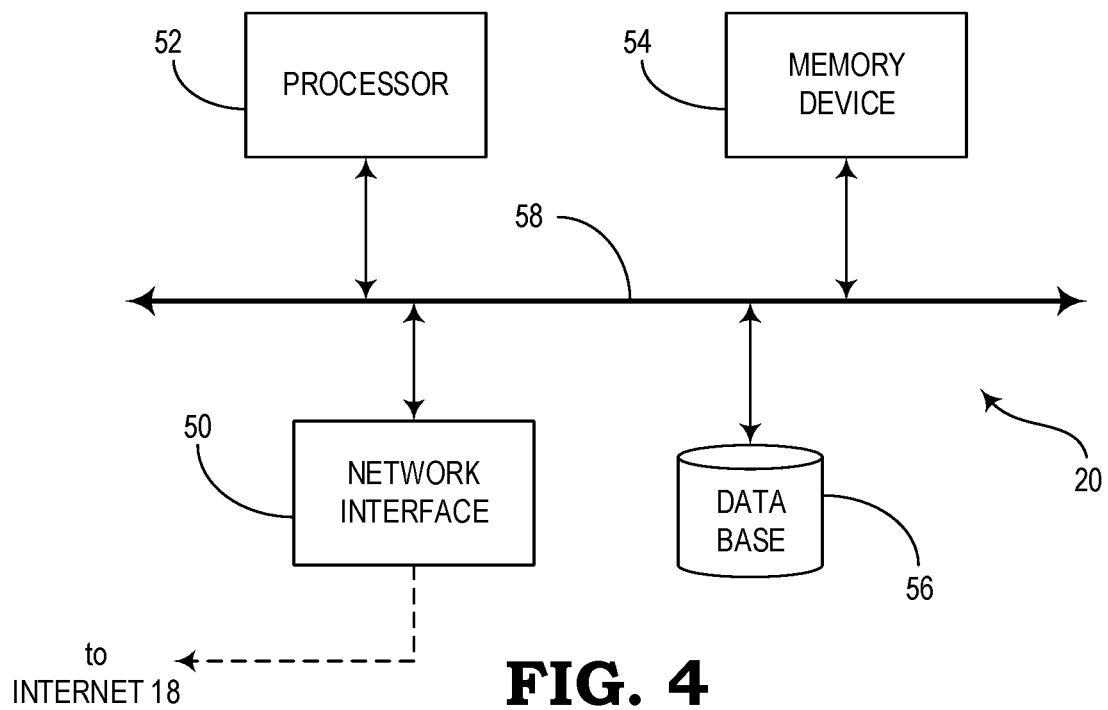
FIG. 4 is a block diagram illustrating a cloud computing device of the telecommunications system of FIG. 1, according to various embodiments.

FIG. 4 is a block diagram illustrating an embodiment of the cloud computing device 20 of the telecommunications system 10. The cloud computing device 20, according to some embodiments, may include at least a network interface 50, a processor 52, a memory device 54, and a database 56, each interconnected via a bus interface 58. The network interface 50 is configured to communicate with the network edge devices 14 via the Internet 18. For example, if the network edge device 14 determines that at least a portion of IoT data obtained at the network edge device 14 is to be processed at the cloud computing device 20, the network interface 50 may be configured to receive the IoT data and store the data locally in the memory device 54 or database 56. The processor 52 may be configured to run various IoT programs (e.g., stored as IoT applications in the memory device 54) and temporarily store results in the memory device 54 and/or database 56. Furthermore, the cloud computing device 20 may be configured such that the network interface 50 sends the processing results back to the network edge device 14 that requested assistance with the processing of the IoT data.

Figure 5:
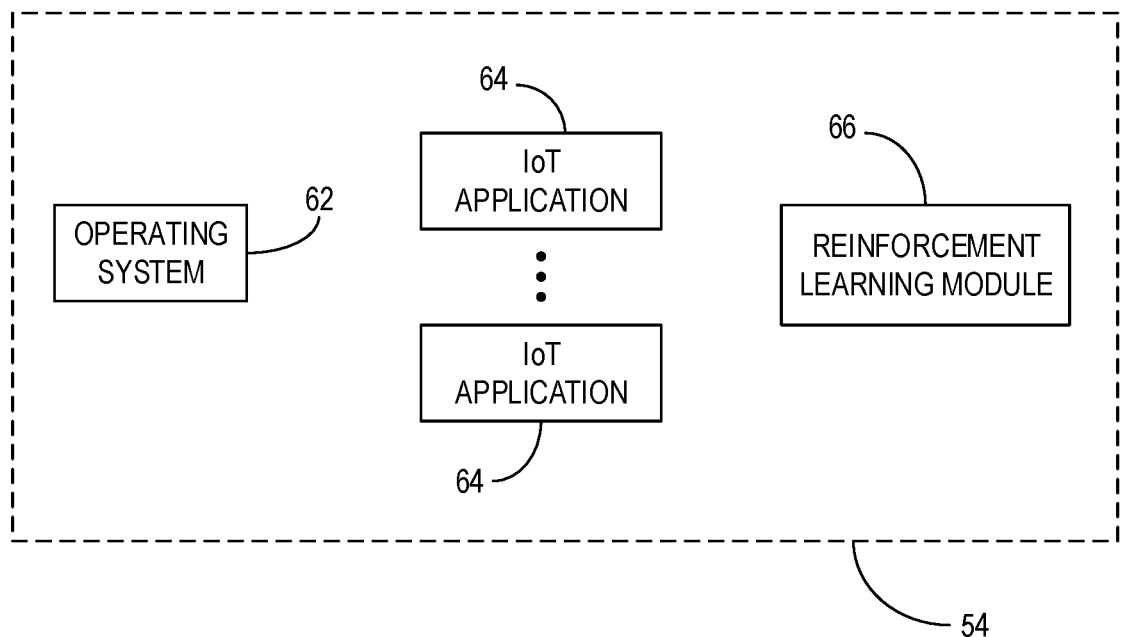
FIG. 5 is a block diagram illustrating a memory device of the cloud computing device of FIG. 4, according to various embodiments.

FIG. 5 illustrates a block diagram of an embodiment of the memory device 54 of the cloud computing device 20 shown in FIG. 4. In this embodiment, the memory device 54 may include an operating system 62 and may further include one or more instantiations of IoT applications 64. It should be noted that the IoT applications 64 for use by the cloud computing device 20 may include the same or similar software code as the software code of the IoT application 42 used by the network edge devices 14. In some embodiments, however, the IoT applications 64 in the cloud computing device 20 may include greater complexity to allow the cloud computing device 20 to provide greater precision or greater operational functions for processing the IoT application software as compared with that of the network edge devices 14. Also, the IoT applications 64 may correspond to IoT applications 42 of multiple network devices 14. For instance, the cloud computing device 20 may include an instantiation of one or more IoT applications corresponding to instantiations of IoT applications on a first network edge device 14, an instantiation of one or more IoT applications corresponding to instantiations of IoT application on a second network edge devices 14, etc.

In addition, the memory device 54 of FIG. 5 further includes a reinforcement learning module 66, which may be similar to the reinforcement learning module 44 shown in FIG. 3. The reinforcement learning module 66 may include code (e.g., neural network code) for calculating future selection criteria based on historic data. More specifically, based on various processing factors (e.g., cost, availability, latency, etc.) of processing IoT data at the network edge and in the cloud and the actual results to that processing, the reinforcement learning module 66 may be configured to recognize various patterns in the data and results to determine how future selections (regarding where IoT data is processed) can be made. The respective reinforcement learning modules 44, 66 of the edge device 14 and cloud computing device 20, according to various embodiments, may be instantiated in one or both of the network edge device 14 and cloud computing device 20.

Figure 6A:
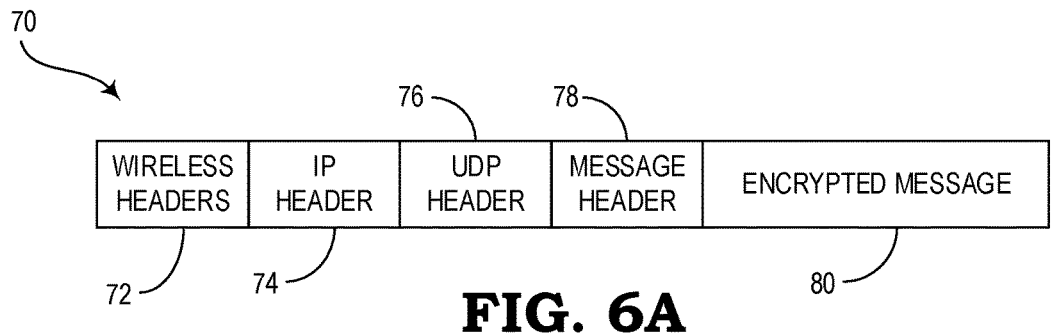
FIG. 6A is a block diagram illustrating a message format of a wireless IoT message, according to one embodiment.

FIG. 6A is a block diagram illustrating a message format of a wireless IoT message 70, according to one embodiment, for communication between the IoT devices 12 and the network edge devices 14. The wireless IoT message 70 includes wireless headers 72, an IP header 74, a UDP header 76, a message header 78, and an encrypted message 80 representing the body or payload of the wireless IoT message 70. The network edge devices 14 may be configured to receive the wireless IoT message 70 from one of the IoT devices 12. In this respect, the network edge device 14 may be considered an eNB device for terminating the wireless protocol used for transmitting signals from the IoT devices 12 to the network edge devices 14. The wireless headers 72 are stripped such that the network edge device 14 can use the IP protocols for local routing.

Figure 6B:
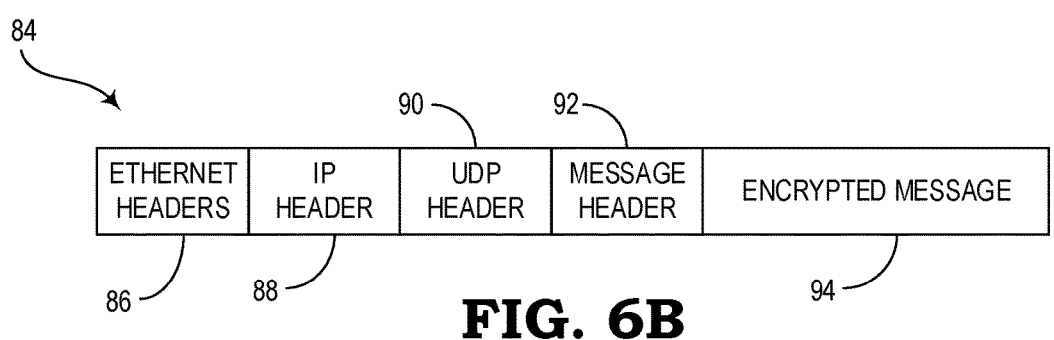
FIG. 6B is a block diagram illustrating a message format of an Ethernet IoT message, according to one embodiment.

FIG. 6B is a block diagram illustrating a message format of a wired message 84, according to one embodiment, for communication between the cloud computing device 20 and the network edge devices 14 via the Internet 18. The wired message 84 includes Ethernet headers 86, an IP header 88, a UDP header 90, a message header 92, and an encrypted message 94 representing the body or payload of the wired message 84. This communication occurs on the opposite side of the network edge device 14 with respect to the wireless communication network. In some respects, the network edge device 14 may be considered to be a termination of the wired protocols (e.g., Ethernet protocols). The Ethernet headers 86 are stripped such that the network edge device 14 can use the IP protocols for local routing.

The IP headers 74, 88 of the messages 70, 84 can be used for local packet routing. The UDP header 76, 90 is used to specify the port number of the message server. There may be multiple message servers on the network edge device 14 using different IP addresses, or they may use the same IP address with different port numbers. The message header 78, 92 may specify application name, encryption status, IP address, and port of the IoT applications 42. Finally, the encrypted message 80, 94 can be processed as needed according to the IoT applications 42 running on the various network edge devices 14.

Figure 7A:
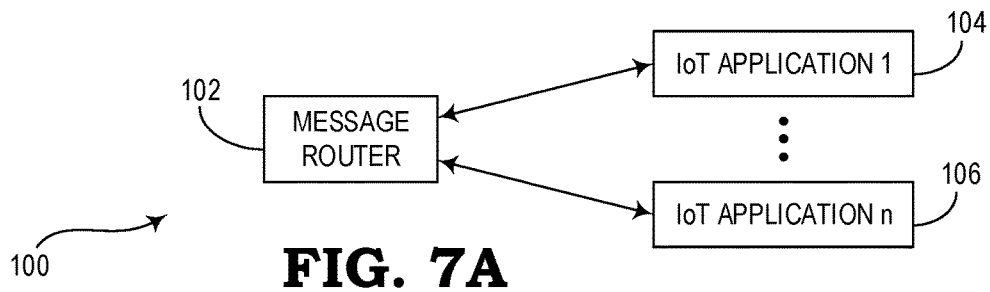
FIG. 7A is a block diagram illustrating a first message routing link for local processing, according to one embodiment.

FIG. 7A is a block diagram illustrating a first message routing link 100 for local processing, according to one embodiment. In the first message routing link 100, a message router 102 (or message router 26 shown in FIG. 2) communicates with one or more IoT applications, such as a first IoT application 104 through an nth IoT application 106. The message router 102 may be connected to the IoT applications 104, 106, etc. directly through an operating system inter-process communication (IPC) facility. The message header (e.g., message header 78, 92 shown in FIGS. 6A and 6B) may be used by the message router 102 to transmit the messages to the IoT applications 104, 106, etc. The message router 102 may utilize the messaging strategies established by the messaging module 41.

Figure 7B:
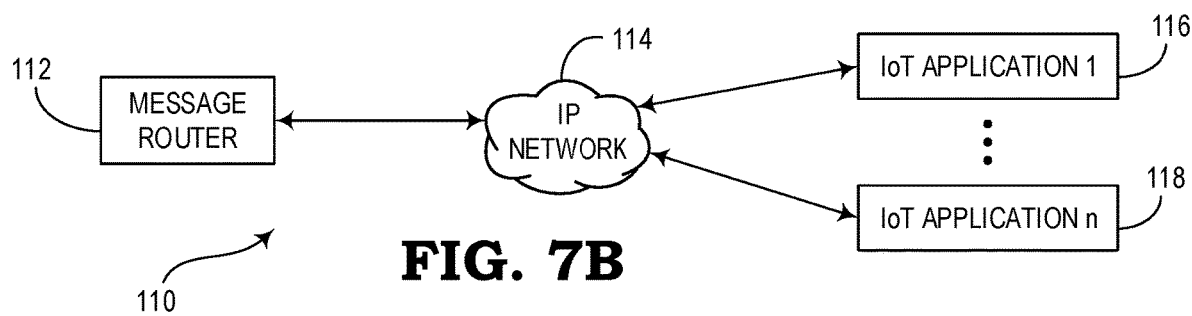
FIG. 7B is a block diagram illustrating a second message routing link for cloud processing, according to one embodiment.

FIG. 7B is a block diagram illustrating a second message routing link 110 for cloud processing, according to one embodiment. In the second message routing link 110, a message router 112 (e.g., message router 26 or message router 102) communicates remotely with one or more IoT applications, which may be instantiated at one or more cloud computing devices 20 for cloud computing. In this example, a first IoT application 116 and an nth IoT application 118 are illustrated, although as few as one IoT application or any number of IoT applications may be instantiated and utilized by each of one or more cloud computing devices 20, according to various embodiments. The message router 112 may be connected to the IoT applications 116, 118, etc. using any suitable network protocol, such as Internet Protocol (IP) via an IP network 114 (e.g., Internet 18). The message header (e.g., message header 78, 92 shown in FIGS. 6A and 6B) may also be used by the message router 112 in this embodiment to transmit the messages to the IoT applications 116, 118, etc.

Figure 8:
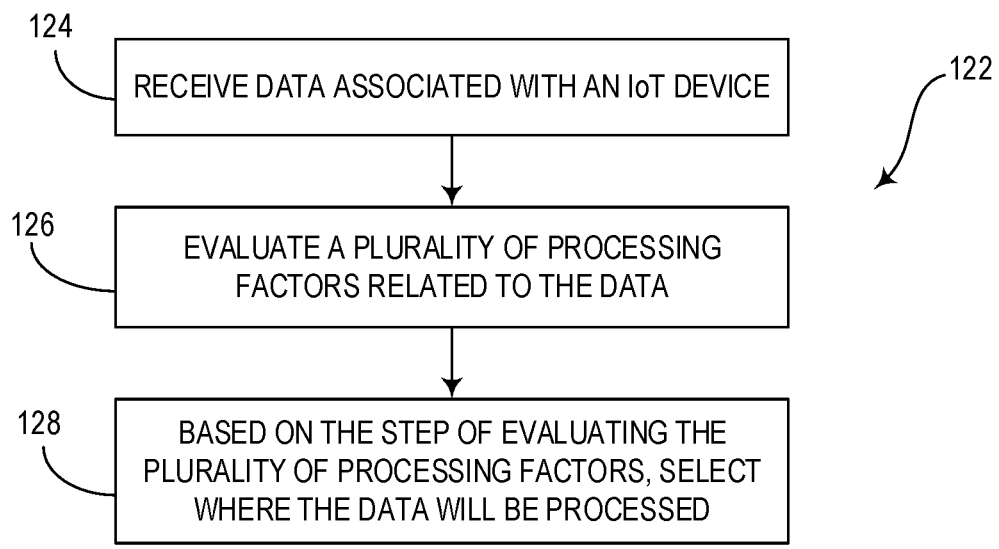
FIG. 8 is a flow diagram illustrating a first method of processing IoT messages, according to various embodiments.

FIG. 8 is a flow diagram showing an embodiment of a method 122 of processing IoT messages. In this embodiment, the method 122 includes a step of receiving data associated with an IoT device, as indicated in block 124. As indicated in block 126, the method 122 further includes the step of evaluating a plurality of processing functions related to the data. Based on the step of evaluating the plurality of processing factors, the method 122 further includes the step of selecting where the data will be processed.

Therefore, according to one embodiment of the present disclosure, a method is provided for determining where data processing will take place. For example, in this embodiment, the method may include the steps of receiving data associated with an IoT device and evaluating a plurality of processing factors related to the data. Based on the step of evaluating the plurality of processing factors, the method may further include the step of selecting where the data will be processed.

In addition, the step of selecting where the data will be processed may include the step of determining whether the data will be processed at a network edge device or at a cloud computing device, the cloud computing device being in communication with the network edge device via the Internet. The method may further comprise the step of utilizing a message router instantiated on the network edge device to deliver the data in an application layer message. The application layer message may be delivered to a processor of the network edge device for local processing or delivered to the cloud computing device for remote processing. The step of evaluating the plurality of processing factors may include determining a local cost estimate defined by a cost to have the network edge device process the data and determining a cloud cost estimate defined by a cost to have the cloud network device process the data. The step of selecting where the data will be processed may include comparing the local cost estimate and the cloud cost estimate and selecting where the data will be processed based on the lowest cost estimate.

The steps of receiving, evaluating, and selecting may be executed by a network edge device (e.g., edge device 14) at an edge of the Internet 18. The network edge device 14 may include wireless network communication elements and wired network communication elements, wherein the network edge device may include one of a wireless network base station, a server connected to a wireless network base station, a vehicle, and a 5G User Equipment (UE) device running a third party IoT application.

The processing factors may include at least pricing factors and latency factors. In addition, the processing factors may further include at least one of availability factors, performance requirement factors, Quality of Service (QoS) factors, Service Level Agreement (SLA) factors, bandwidth factors, resource factors, processing precision factors, and computing power factors.

According to some embodiments, the method may further comprise the step of storing a history of evaluations and selections in a table, where the evaluations are related to evaluated processing factors related to data associated with IoT devices, and where the selections are related to selected processing devices where the data associated with the IoT devices is processed. Also, the method may comprise the step of utilizing a neural network to analyze the history to assist in selecting where future IoT data will be processed. The method may further comprise the step of using a pattern recognition process, machine learning process, or reinforcement learning process to analyze the history. The neural network may be instantiated at a network edge device or a cloud computing device.

The method may also include the step of receiving data associated with a plurality of IoT devices 12. Also, the method may include the step of routing application layer messages, which are associated with the received data, to a plurality of IoT applications (e.g., IoT applications 42) instantiated on the network edge device 14.

Since the decision of where to process the IoT code may not necessarily be an easily apparent decision, the processing analysis module 40 of FIG. 3 and the methods of the present disclosure may be useful in assisting with this decision. The method of FIG. 8 can therefore provide important software development and utilization functions in the field of networking systems. In particular, for IoT applications 42, 64 that might require intensive processing, the cost of delivering IoT data to the cloud may be significant. However, not all the processing of this data can be done at the edge due to its computing power constraints. One way to address the constrained resources is to lower the detection precision. If that precision is too low to meet certain quality requirements, the cost to ship out the data processing tasks may be worth it in some cases. Balancing these various factors to determine where parts or all of the IoT data will be processed may include the consideration of a number of variables.

In one example, the decision of where to process may be "comparison-based." The methods may include determining the cost of performing actions at the edge and in the cloud and selecting the location with lowest cost for performing the actions. Here, the term "cost" may refer to a monetary rate, price, charge, or expense, but in other embodiments, the cost may refer to a more general definition (e.g., the toll or loss suffered by waiting for a high latency or other negative consequence or result). Even when defined in the second sense, the term "cost" (when referring to latency, resource availability, performance requirement, processing precision, status of edge resources, status of cloud resources, bandwidth, computing power, and other processing factors) may be evaluated by the systems and methods of the present disclosure in monetary terms in order to determine a total cost (e.g., in U.S. dollars) of local processing versus remote processing. The "cost" of these various processing functions may be set or may be variable, according to different embodiments. For example, if latency issues are very important in one type of IoT application (e.g., where quick response is needed to get relevant information to the IoT devices or users, such as a vehicle response type of action), the "cost" of remote processing may be given a very high rate, thereby essentially eliminating the viability of remote processing in this case.

In addition to comparison-based decision making, other examples provided by the present disclosure may include operating on a "threshold basis." For instance, in this situation, the systems and methods may accumulate the costs of performing the processing actions at the edge. However, once the accumulated cost reaches or exceeds a certain threshold, a switch is made to thereafter select to disseminate the IoT data to the cloud for processing.

Alternatively to the cost-based decisions and threshold-based decisions, the systems and methods of the present disclosure may further include decision making based on reinforcement learning, as suggested above with respect to the reinforcement learning modules 44, 66 residing on either or both of the edge device 14 or cloud computing device 20. The reinforcement learning includes learning based on historic data collected over time. The historic data may include the various processing factors that were estimated before decisions were made, the actual costs that were incurred after the decisions were made, the actual latency experienced, the variable levels of availability of edge or cloud resources at different times of the day, week, month, or year, other estimated processing factors predicted and the corresponding actual processing factors experienced or suffered, etc.

Figure 9:
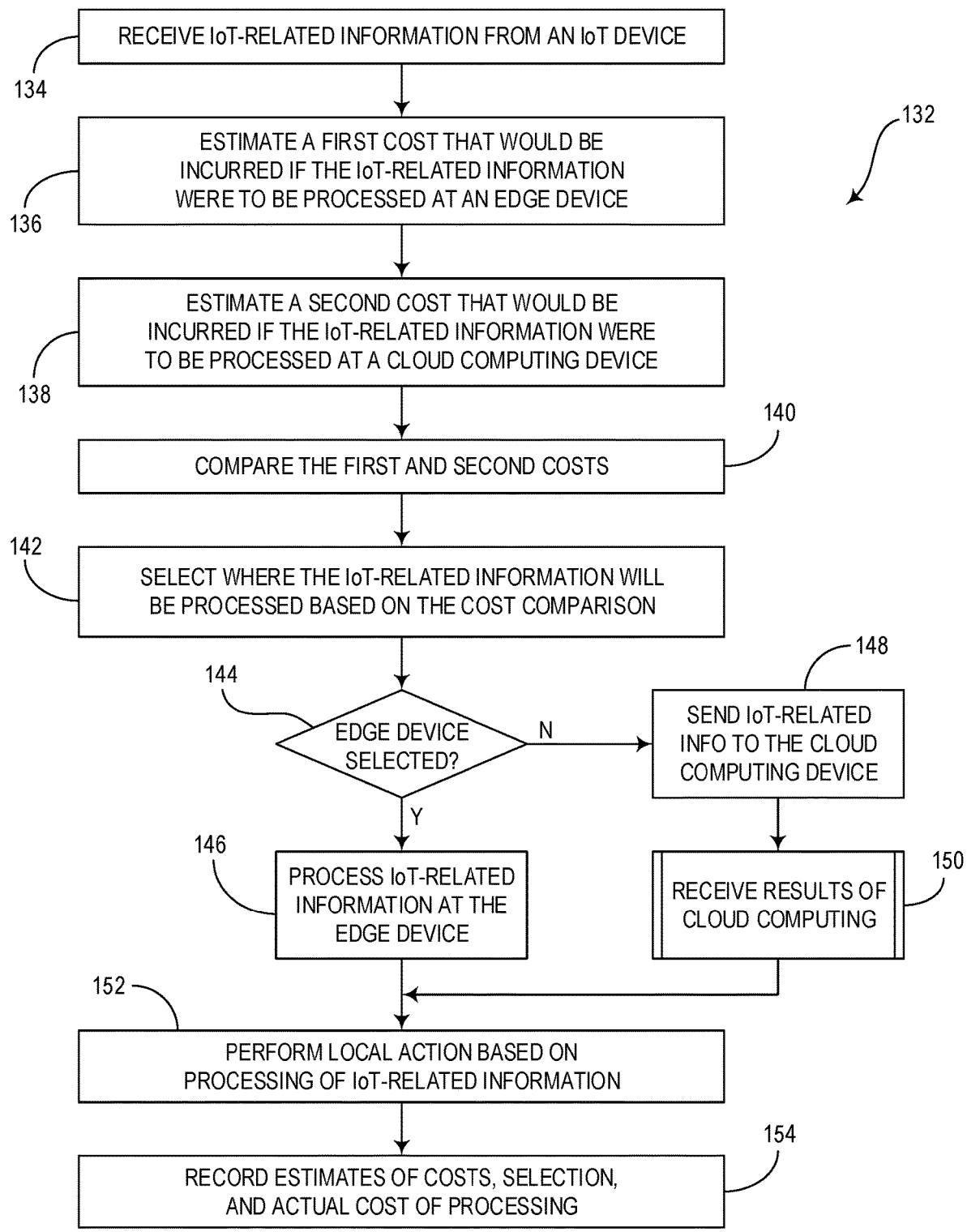
FIG. 9 is a flow diagram illustrating another method of processing IoT messages, according to various embodiments.

FIG. 9 shows a flow diagram of another method 132 of processing IoT messages, according to one embodiment. The method 132 includes receiving IoT-related information from an IoT device, as indicated in block 134. The IoT-related information, in some embodiments, may be received wirelessly. The step indicated in block 134 may be performed at an edge of the network by an edge device. The method 132 further includes estimating a first cost that would be incurred if the IoT-related information were to be processed at an edge device, as indicated in block 136. According to block 138, the method 132 further includes estimating a second cost that would be incurred if the IoT-related information were to be processed at a cloud computing device. For example, the costs may refer to prices charged for processing at either the edge device or cloud computing device, or, in other embodiments, the term "cost" may refer to other factors, such as a latency cost, resource availability cost, etc.

The method 132 further includes comparing the first and second costs, as indicated in block 140. The method 132 also includes selecting where the IoT-related information will be processed based on this cost comparison, as indicated in block 142. The cost comparison may include comparing the overall costs (i.e., monetary cost and/or other types of costs based on latency, available, service quality requirements, etc.) to determine which cost is the lowest. In another embodiment, the comparison may involve comparing the cost of edge computing to determine if the cost exceeds a predetermined threshold. If so, then the cloud may be selected for future processing tasks.

At this point, the method 132 proceeds to decision diamond 144, which includes determining whether the edge device has been selected to process the IoT-related information. If so, the method 132 proceeds to block 146. Otherwise, the method 132 proceeds to block 148. According to block 146, the method 132 includes processing the IoT-related information at the edge device and thereafter moving on to block 152. According to block 148, the method 132 includes sending the IoT-related information to a cloud computing device and then waiting to receive the results of the cloud processing, as indicated in block 150. After block 150, the method proceeds to block 152.

After the IoT-related information has been processed by either the edge device or the cloud computing device and the results of that processing has been obtained, the method include the step of performing one or more local actions based on the processing of the initial IoT-related information, as indicated in block 152. In some embodiments, the method 132 may further include the step of recording estimates of the costs (as determined in blocks 136 and 138), recording comparisons of these costs (as determined in block 140), recording actual operating/processing costs, and recording other processing factors associated with the processing of the IoT-related information. For example, this information can be stored or recorded in a table.

Also, according to additional embodiments, a neural network or machine learning process may include utilizing the recorded information (e.g., recorded in block 154). The results of the machine learning processes may be used (e.g., by the reinforcement learning module 44, 66) to assist with future selection processes (e.g., similar to block 142) to adjust what parameters or factors are used and how they are used to determine whether the IoT-related information should be processed at the edge or in the cloud.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium configured for storing a program that is executable by a processing device, the program enabling the processing device to:
   receive data associated with an Internet of Things (IoT) device;
   evaluate a plurality of processing factors related to the data by
      determining a local cost estimate defined by a pricing factor and a latency factor to have an edge device process the data, and
      determining a cloud cost estimate defined by a pricing factor and a latency factor to have a cloud computing device process the data, the cloud computing device being in communication with the edge device via the Internet;
   compare the local cost estimate with the cloud cost estimate to determine a lowest cost estimate;
   select where the data is processed based on the lowest cost estimate;
   utilize a message router instantiated on the edge device to deliver the data in an application layer message to the processing device for local processing or to the cloud computing device for remote processing; and
   store a history of evaluations and selections, the evaluations related to evaluated local cost estimates and cloud cost estimates related to historic data associated with the IoT device, and the selections related to selected processing devices where the data associated with the IoT device is historically processed.

2. The non-transitory computer-readable medium of claim 1, wherein the processing factors include the pricing factors and the latency factors, and further include at least one of availability factors, performance requirement factors, Quality of Service (QoS) factors, Service Level Agreement (SLA) factors, bandwidth factors, resource factors, processing precision factors, and computing power factors.

3. A method comprising the steps of:
   receiving data associated with an Internet of Things (IoT) device;
   evaluating a plurality of processing factors related to the data by
      determining a local cost estimate defined by a pricing factor and a latency factor to have an edge device process the data, and
      determining a cloud cost estimate defined by a printing factor and latency factor to have a cloud computing device process the data, the cloud computing device being in communication with the edge device via the Internet;
   based on the step of evaluating the plurality of processing factors, comparing the local cost estimate with the cloud cost estimate to determine a lowest cost estimate and selecting where the data is processed based on the lowest cost estimate;
   utilizing a message router instantiated on the edge device to deliver the data in an application layer message, the application layer message delivered to a processor of the edge device for local processing or delivered to the cloud computing device for remote processing;
   storing a history of evaluations and selection, the evaluations related to evaluated local cost estimates and cloud cost estimates related to historic data associated with the IoT device, and the selections related to selected processing devices where the data associated with the IoT device is historically processed.

4. The method of claim 3, wherein the steps of receiving, evaluating, and selecting are executed by the edge device at an edge of the Internet.

5. The method of claim 4, wherein the edge device includes wireless network communication elements and wired network communication elements, and wherein the edge device is configured as one of a wireless network base station, a server connected to a wireless network base station, a vehicle, and a 5G User Equipment (UE) device running a third party IoT application.

6. The method of claim 3, wherein the processing factors further include at least one of availability factors, performance requirement factors, Quality of Service (QoS) factors, Service Level Agreement (SLA) factors, a status of edge computing environment, a status of network connection to the cloud, bandwidth factors, resource factors, processing precision factors, and/or computing power factors.

7. The method of claim 3, further comprising the steps of
storing the history of the evaluations and selections in a table, the evaluations related to evaluated processing factors related to data associated with the IoT device, and the selections related to selected processing devices where the data associated with the IoT device is actually processed; and utilizing a neural network to analyze the history to assist in selecting where future IoT data will be processed.

8. The method of claim 7, further comprising the step of using a pattern recognition process, machine learning process, or reinforcement learning process to analyze the history, wherein the neural network is instantiated at the edge device and/or at the cloud computing device.

9. The method of claim 3, further comprising the steps of
receiving data associated with a plurality of IoT devices; and routing application layer messages, which are associated with the received data associated with the plurality of IoT devices, to a plurality of IoT applications instantiated on the edge device.

10. An edge device comprising:
a message router;
a processor; and
a memory configured to store a program;
wherein the program, when executed, causes the processor to
receive data associated with one or more Internet of Things (IoT) devices,
evaluate a plurality of factors related to processing of the data by
determining a local cost estimate defined by a pricing factor and a latency factor to have the processor process the data locally, and
determining a cloud cost estimate defined by a pricing factor and a latency factor to have a cloud computing device process the data, the cloud computing device being in communication with the edge device via the Internet, and
decide where the data is processed based on a comparison between the local cost estimate and the cloud cost estimate to determine a lowest cost estimate, wherein, depending on the decision of where the data will be processed, the message router is configured to send the data to the processor for local processing or send the data to the cloud computing device for remote processing;

wherein the message router is configured to deliver the data in an application layer message, the application layer delivered to the process for local processing or delivered to the cloud computing device for remote processing; and wherein the memory is further configured to store a history of evaluations and selections, the evaluations related to evaluated local cost estimates and cloud cost estimates related to historic data associated with the one or more IoT devices, and the selections related to selected processing device where the data associated with the one or more IoT devices is historically processed.

11. The edge device of claim 10, further comprising wireless network communication elements and wired network communication elements, wherein the edge device is configured as a wireless network base station, a server connected to a wireless network base station, a vehicle, and a 5G User Equipment (UE) device running a third party IoT application.

12. The edge device of claim 10, wherein the memory is further configured to store one or more IoT applications, and wherein the message router is configured to route application layer messages associated with the received data to the one or more IoT applications instantiated on the edge device.

* * * * *